US012553600B2

(12) United States Patent
Visser et al.

(10) Patent No.: US 12,553,600 B2
(45) Date of Patent: Feb. 17, 2026

(54) UNDERBED ILLUMINATION SYSTEM AND METHOD

(71) Applicant: Ergomotion, Inc., Goleta, CA (US)

(72) Inventors: Jordan Visser, Byron Center, MI (US); Cort C. Corwin, Grand Haven, MI (US); Eric Bryant, Nunica, MI (US)

(73) Assignee: Ergomotion, Inc., Goleta, CA (US)

(*) Notice: Subject to any disclaimer, the term of this patent is extended or adjusted under 35 U.S.C. 154(b) by 0 days.

(21) Appl. No.: 19/036,934

(22) Filed: Jan. 24, 2025

(65) Prior Publication Data
US 2025/0237375 A1 Jul. 24, 2025

Related U.S. Application Data

(60) Provisional application No. 63/624,492, filed on Jan. 24, 2024.

(51) Int. Cl.
F21V 33/00 (2006.01)
F21V 23/04 (2006.01)
F21Y 115/10 (2016.01)

(52) U.S. Cl.
CPC ...... *F21V 33/0012* (2013.01); *F21V 23/0471* (2013.01); *F21Y 2115/10* (2016.08)

(58) Field of Classification Search
CPC .... F21V 23/0442–0492; F21V 33/0004–0076; F21Y 2115/00
See application file for complete search history.

(56) References Cited

U.S. PATENT DOCUMENTS

| 6,234,642 | B1 * | 5/2001 | Bokamper .......... F21V 33/0072 |
| | | | 362/130 |
| 10,334,960 | B2 | 7/2019 | Edward et al. |
| 10,648,659 | B2 * | 5/2020 | Jönsson .................. A61G 7/05 |
| 11,419,553 | B2 | 8/2022 | Gehrke et al. |
| 2016/0007886 | A1 | 1/2016 | Shimizu |
| 2021/0034989 | A1 | 2/2021 | Palashewski et al. |
| 2022/0323001 | A1 | 10/2022 | Nunn et al. |

FOREIGN PATENT DOCUMENTS

| FR | 3047342 A1 * | 8/2017 | ......... G08B 21/0469 |
| KR | 20150107522 A | 9/2015 | |
| KR | 20190052468 A | 5/2019 | |
| KR | 20230038338 A | 3/2023 | |
| KR | 102549573 B1 | 6/2023 | |

OTHER PUBLICATIONS

International Search Report & Written Opinion for Application No. PCT/US2025/012938; mailed May 23, 2025; 10 pp.
Action Lighting, Inc., "Motion Activated Under-Bed Night Lighting", May 19, 2022, 5 pp., https://www.actionlighting.com/motion-activated-under-bed-night-lighting-227bedlight-1/.

* cited by examiner

*Primary Examiner* — Jason M Han
(74) *Attorney, Agent, or Firm* — Bodman PLC

(57) ABSTRACT

An underbed illumination system includes a sensor, one or more lights, and a controller. The sensor is mountable to an underside of a bed and has a field of view that extends to left, foot, and right sides of the bed. The one or more lights are configured to mount to the bed and output light downward from the bed. The controller is configured to detect a person with the sensor and operate the lights to output the light according to the detection of the person.

19 Claims, 14 Drawing Sheets

UNDERBED ILLUMINATION SYSTEM AND METHOD

CROSS-REFERENCE TO RELATED APPLICATION(S)

This application claims priority to and the benefit of U.S. Provisional Application No. 63/624,492, filed Jan. 24, 2024, the entire disclosure of which is incorporated by reference herein.

TECHNICAL FIELD

The present disclosure relates generally to the field of beds and more particularly relates to a system of underbed occupant presence detection, illumination and projection for bedframes and its methods of operation.

BACKGROUND

Task lighting near a bed may be useful for a user who is preparing for sleep, but exposure to excessively bright light should be avoided prior to the onset of sleep. Exposure to variable light colors, patterns, or intensities may be beneficial in promoting sleep onset. Conventional bedside lighting solutions are typically static, too bright, and require manual control and activation.

It is therefore desirable to provide an innovative system for underbed and bedside lighting that is adaptive to the position and/or pose of a user when standing next to or occupying a bed. It is further desirable to provide a system that automatically actuates lighting conditions based on occupant detection.

SUMMARY

Disclosed herein are implementations of an underbed illumination system and related methods. In an implementation, an underbed illumination system includes a sensor, one or more lights, and a controller. The sensor is mountable to an underside of a bed and has a field of view that extends to left, foot, and right sides of the bed. The one or more lights are configured to mount to the bed and output light downward from the bed. The controller is configured to detect a person with the sensor and operate the lights to output the light according to the detection of the person.

The sensor may be a RADAR sensor. The one or more lights may include light emitting diodes (LEDs). The controller may be configured to determine a location of the person according to the sensor and operates the lights to output the light according to the location of the person. The location may include a direction and a location from the sensor to the person, and the controller may determine which of the LEDs to output the light according to the direction and determines the brightness of the light output by those LEDs according to the distance. The controller may determine which of the LEDs to output the light to be those LEDs that are about a vector extending from the sensor to the person. The controller may gradually increase the brightness of the light output by the LEDs as the person moves closer to the bed. The controller may determine which of the LEDs to output the light according to one of three or more side zones in which the person is located, and each of the side zones may be an angular region within a field of view of the sensor. The controller may increase the brightness of the light output by the LEDs in a stepped manner as the person moves closer to the bed from an outer proximity zone to an inner proximity zone, the outer proximity zone being positioned away from the bed and the inner proximity zone being adjacent the bed. The controller may configured to determine when the person enters or leaves a detection zone and, respectively, gradually increases or decreases the brightness of the light output by the LEDs. If the controller determines the locations of two persons, the controller may operate the lights according to the locations of the two persons. If the controller determines the location of three or more persons, the controller operates the lights according to a group of the three persons. The one or more lights may include a projector that is configured to project one or more images onto the ground. The projector may be configured to display one or more static images. The underbed illumination system may be configured to operate in a first mode with a first detection area and a second mode with a second detection area, and the first detection area may be further from the sensor than the second detection area.

In an implementation, a method is provided for underbed illumination. The method includes determining, with a sensor coupled to a bed, a location of a person, and outputting, with lights coupled to the bed, light according to the location of the person.

The determining the location may include determining a direction and a distance of the person relative to one of the sensor or another position central to the bed. The outputting the light may include determining a subset of the lights that output the light according to the direction and determining an intensity of the light output by the subset of lights according to the distance. The subset of the lights may be positioned between the one of the sensor of the other position and the person, and the intensity of the light may increase as the distance lessens. The subset of the lights and the intensity of the light may change gradually as the location determined with the sensor changes. The subset of the lights and the intensity of the light may change in a stepped manner as the location determined with the sensor changes.

Figure 1:
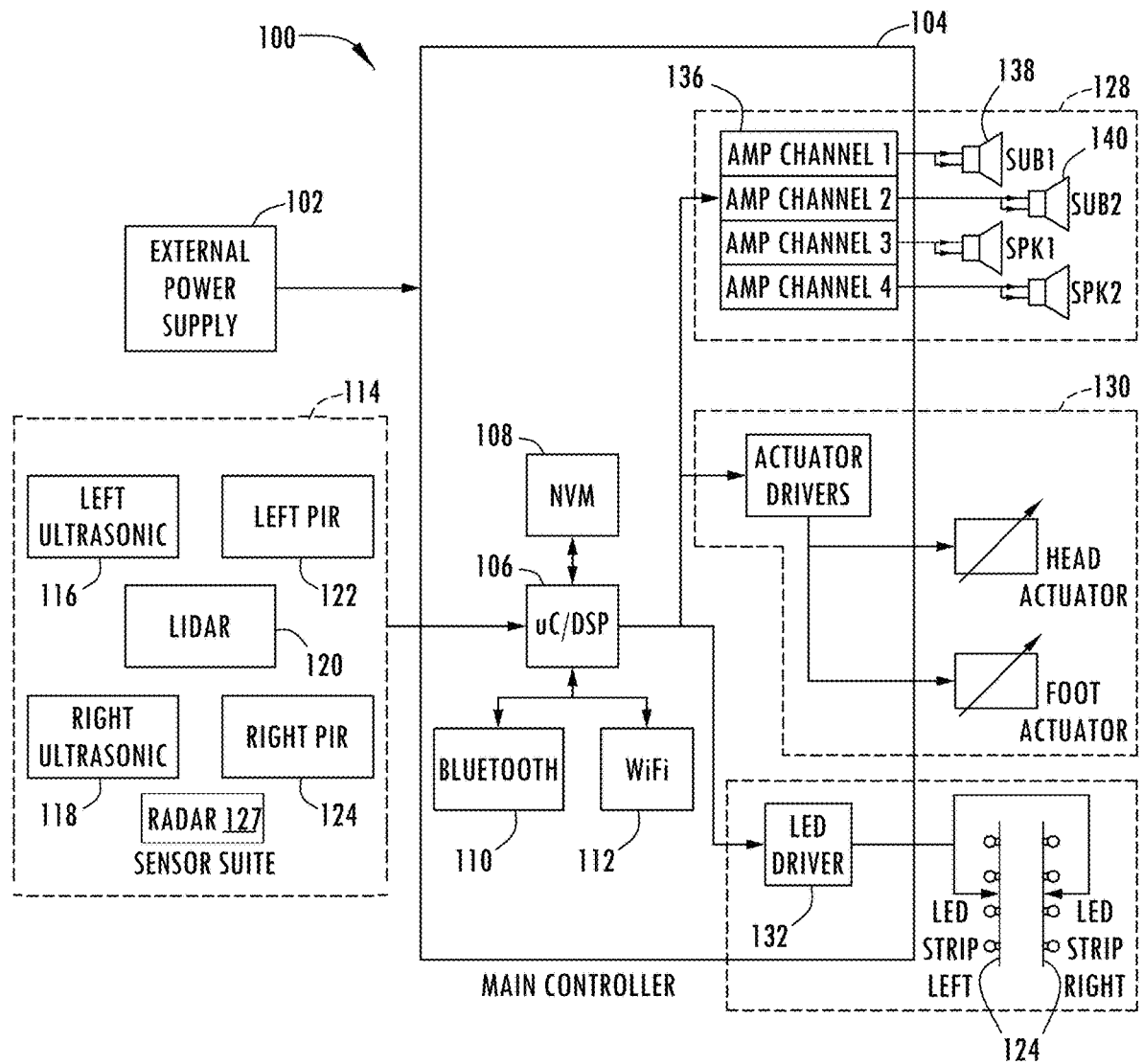
FIG. 1 is a schematic presentation of an exemplary system according to the present disclosure.

The details of one or more examples of the disclosure are set forth in the accompanying drawings and the description below. Other aspects, advantages, purposes, and features will be apparent upon review of the following specification in conjunction with the drawings, where like reference numerals indicate like parts.

DETAILED DESCRIPTION

Example implementations shown in the drawings and described herein provide a underbed illumination system for sensing the presence, position, pose, orientation and movement of an occupant or user of the bed and/or a bystander in proximity to the bed underbed illumination system. The underbed illumination system may include one or more sensors, such as a RADAR sensor or sensors, LIDAR sensor or sensors, passive infrared sensor or sensors, or combinations thereof. The sensors are capable of accurately detecting the human occupants of a room and discriminating between human occupants and other stationary objects, such as walls or furniture, or other moving objects, such as cleaning robots or pets. Potential combinations of sensors include one or more of passive infrared (PIR), ultrasonic, optical time-of-flight range finding, millimeter-wave radar, rotating LIDAR scanner, capacitive/e-field, and a controller implementing computer vision operations.

The example implementations shown in the drawings and described herein further provide a method for dynamically generating an output display of light as illumination or in projected patterns, such as informational displays. The projections can take multiple forms via a linear array of addressable LEDs, such as multi-colored RGB emitters with serial communication, multiple LEDs each connected to a lens or filter that is capable of changing the light output into a usable form such as a logo or pictogram, a moveable array of lenses or filters associated with one or more emitters such that the appropriate picograph can be selected and displayed. The projections can take further forms, in addition or in the alternative, as a projector such as a Digital Light Processor (DLP) and illuminator assembly with the necessary mechanisms to correct for "keystoning." The underbed illumination system may further include mechanisms for acquiring other information, including but not limited to, sensors for ambient light levels, network connections which obtain various information about the occupant and the environment including an electronic calendar and scheduling information for the occupant, sleep quality and health statistics, weather forecasts, and combinations thereof.

The example implementations shown in the drawings and described herein further include the logic elements required to process data and use the data to determine the output of the light display mechanism, as well as other functions of the bed such as platform adjustment or vibratory massage according to predefined rules stored and executable by the underbed illumination system. The logic elements may comprise a software application ("app") on board the bed-mounted underbed illumination system components, a user's mobile device, or combinations thereof. The app can be used to configure the functionality of the underbed illumination system or manually control the various functional modes.

The generated output of illumination may be used for the purpose of task lighting to aid with getting into or out of the bed, may be displaying information that is useful to the occupant, or may provide soothing lighting effects to achieve and maintain sleep or deep relaxation, such as dynamic lighting patterns, fades, or the like. In one example, the underbed illumination system may execute a program that determines if a user's legs are near the bed and drives one or more LEDs to illuminate the area around the user's feet for the purpose of putting on footwear. In another example, in the alternative or in combination, the underbed illumination system may execute a program that determines a user's egress from the bed based on a user's detected pose and position, and in response, generate and output display of projected information about the user's upcoming day, such as calendar events, weather, physical fitness status, or other information. In another example, in the alternative or in combination, the generated output lighting can indicate the quality of present sleep conditions.

The generated output of illumination may be used to provide illumination patterns and routines that are beneficial in achieving relaxation and/or sleep. The underbed lighting can be manipulated in color, intensity, and position to achieve the desired effect. Examples include a simulation of twinkling starlight, multi-color illumination that is synchronized to music, light levels that appear to "breathe" along with the occupant, or circadian light therapy that utilizes changes in color and intensity to correspond with the user's relaxation level or sleep state.

The generated output of illumination may be used to entice a user toward the bed and to provide safety in the approach. The presence of a potential occupant can be determined based on the sensed distant presence of a potential user and underbed illumination can be activated at a low intensity with the intensity increasing as the user approaches the bed to encourage the user to come towards the bed. The presence of a bystander adjacent to the bed can also be determined. This determination can be used to deactivate certain automatic operations of certain bed features, such as articulation of adjustable bed frame components, that potentially pose a risk, such as a pinch risk, to the bystander. In another example, the underbed illumination system can determine if a bystander or user has fallen off of or fallen next to the bed and generate an output indicating a need for medical attention, such as through a bright stroboscopic effect or by generating a signal transmitted to a remote device. The underbed illumination system may determine presence of a room occupant and automatically activate a "high-low" height adjustment mechanism or otherwise positioning the bed as desired to aid in the ingress of the user to the bed.

These example implementations provide for presenting information to the user when entering or exiting the bed, adaptively providing lighting to the current location of the user as to improve task function while minimizing disturbance to other occupants and to the user's own sleep state (extraneous lighting is known to disrupt the sleep cycle, including but not limited to decreasing endogenous melatonin). The underbed illumination system of the present disclosure includes sensors adapted for detecting and determining the presence, pose, and position of the nearby environment, and can differentiate between stationary objects, such as other furniture, and moving objects, such as cleaning robots or pets. Other information beyond the presence or absence of users can also be an input for controlling the underbed illumination system, such as calendar events, predefined rules, and other sensor feedback signals. The underbed illumination system outputs can be activated through user interface provided locally on the bed-mounted features of the underbed illumination system or remotely, for example via an app on a mobile computing device. The underbed illumination system outputs can also be activated manually via predefined hand gestures or motions detected by the sensors. In one example, the user could manually actuate a function via a gesture, such as a "swipe" in view of the sensors in one direction to active illumination and a "swipe" in an opposite direction to deactivate the illumination.

Referring to the drawings, FIG. 1 illustrates an underbed illumination system in a representative schematic form. The underbed illumination system 100 may be powered by an external power source or power supply 102. The power supply 102 is in electronic communication with a main controller 104. The main controller 104 includes or is in communication with the primary logical elements of the underbed illumination system 100. While illustrated as a single integrated construction, other alternatives are contemplated within the scope of the present disclosure. The main controller 104 may by mechanically mounted on or integrated with the frame or other structure of a bed. The main controller 104 includes a microcontroller or other digital signal processer 106. The main controller 104 includes non-volatile memory or other data storage device 108 which is in bidirectional electronic communication with the microcontroller 106. The main controller 104 may include wired or wireless communication technology, including Bluetooth 110, WiFi 112, near field communication, local area network modem, other communication technology, or combinations thereof.

The main controller 104 may include or may be in communication with at least one set of sensors 114. The set of sensors 114 may include one or more ultrasonic sensors 116, 118, one or more LIDAR sensors 120, and one or more passive infrared sensor (PIR) 122, 124. The set of sensors 114 may instead or additionally include one or more RADAR sensors 127. The set of sensors 114 may be mechanically mounted to or integrated with the frame or other structure of a bed. The set of sensors 114 may be centrally disposed in a compact package within the envelope of the overall dimensions of the bed frame, or may be distributed with the set of sensors being arranged separately about the bed frame. The set of sensors 114 is arranged to provide a view of at least two lateral sides of the bed frame, between a head-end and a foot-end of the bed. In other implementations, the set of sensors 114 may provide a view of at least three sides of the bed, including the two lateral sides and the foot end. In other implementations, the set of sensors 114 may provide a view of all four sides of the bed, including the two lateral sides, the head end, and the foot end of the bed.

Based on the signals generated by the set of sensors 114, the main controller 104 may generate output signals to one or more output components. The underbed illumination system 100 may include a lighting output component 126, an audio output component 128, bedframe adjustment component 130, or combinations thereof. The lighting output component 126 may include one or more LED drivers 122 in communication with the microcontroller 106 and one or more lighting strips 124. The lighting strips 124 may include individually addressable LEDs for selectively illuminating discrete areas around the bed, which are evenly distributed about the perimeter of the bed and may face downward. The sound output component 128 may include one or more 202 amplifiers 126 in communication with one or more sub-woofers 128 and/or one or more speakers 140. The bedframe adjustment component 120 may include one or more actuator drivers and one or more actuators associated with, for example, a head support panel and a foot support panel for obtaining various support configurations.

Figure 2:
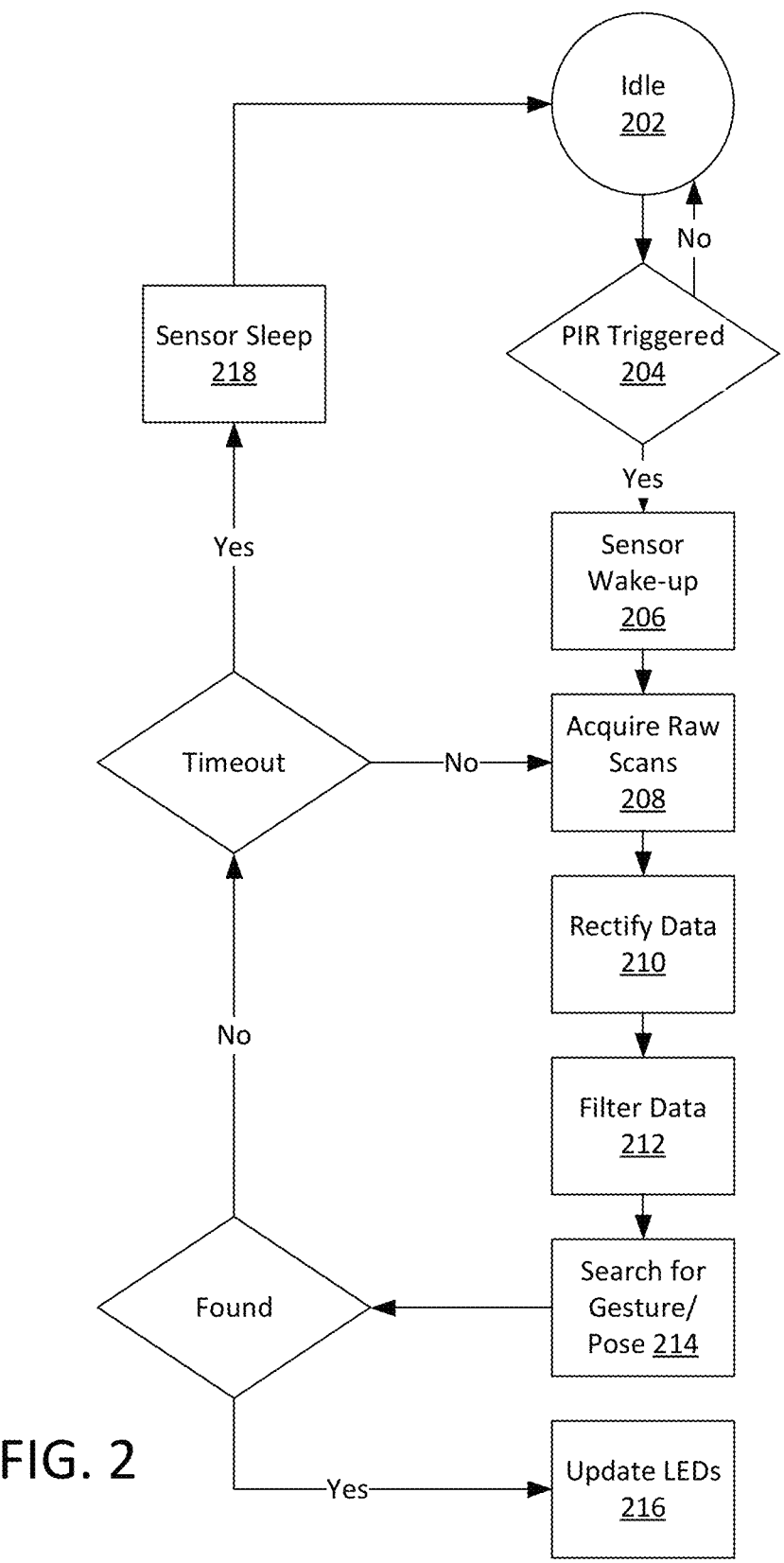
FIG. 2 is a first method of operating an underbed illumination system as illustrated in FIG. 1.

The operations and performance of the methods associated with the underbed illumination system 100 are described below with further reference to the illustration in FIGS. 2-11. The continuous operation of the underbed illumination system is illustrated in FIG. 2 where the underbed illumination system is powered on and occupies an idle state. While in IDLE state at 202, the underbed illumination system waits for a HIGH signal from PIR sensor(s). A HIGH signal ("yes") at 204 transitions the underbed illumination system from IDLE state to ACTIVE and wakes up the sensor suite 114 at 206, otherwise, the underbed illumination system remains in an idle state. The environmental sensing unit, or set of sensors 114, is woken up and made ready to generate data on command. Once the set of sensors 114 is awake, the sensing unit is queried for raw data at 208 (e.g., acquires raw scans). Raw data is held in a 2×N dimensional array holding polar coordinates of the environment relative to the sensing unit. Column zero holds angular measurements (in degrees) and column 1 holds corresponding distances (in mm). In an operation to rectify the data at 210, the absolute value of the difference between calibration and raw data is computed. Any absolute value having a value that is greater than 150 mm is identified as a novel element in the environment. Any element having an absolute value that is less than 150 mm is identified to be the nominal/calibrated environment.

In an operation to filter the data at 212, a median filter of a mask size having a predefined value is applied to all rectified data. This filtering operation de-noises the rectified data. Gesture and pose command inputs are searched for in the filtered data at 214. The search for gesture/pose control is described in further detail below. If a gesture or pose command is found, the underbed illumination system updates the under-bed lighting LEDs at 216 with the corresponding light sequence, or else executes the commanded operations, for example, in the sound output component or the adjustment component. If no gesture or pose command is located within the data within 30 second of the sensor wake-up, a timeout occurs that puts the sensors 114 to sleep at 218 and returns the underbed illumination system to an IDLE state.

Figure 3:
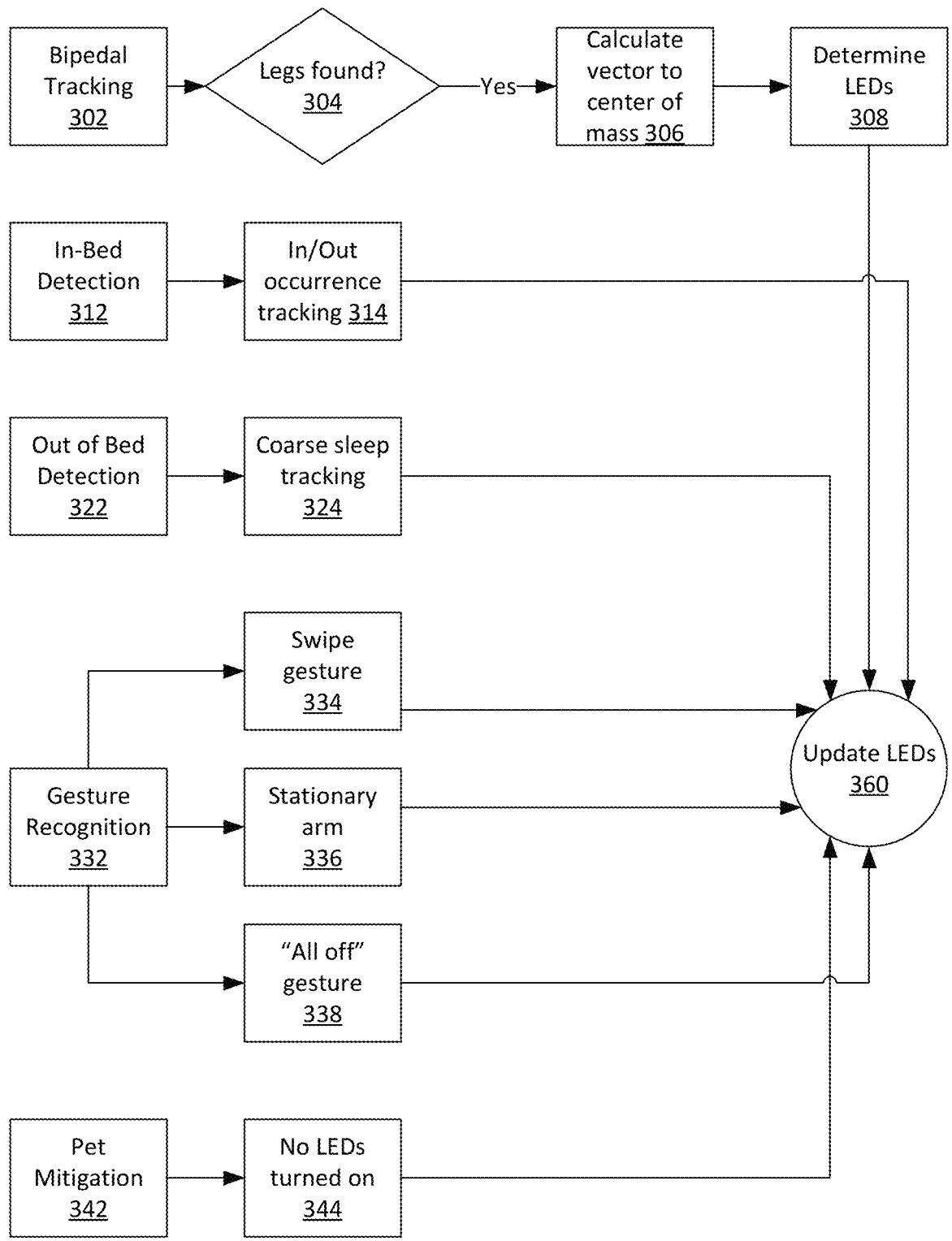
FIG. 3 is a detailed method of the search for gesture or pose control command operation as illustrated in FIG. 2.

The search for gesture or pose command recognition is detailed in FIG. 3. Bipedal tracking (i.e., tracking of two legs) is performed at 302. Any filtered data at distance x (where 750 mm<x<5 m) which spans >50 mm in width is identified as a candidate human leg at 304. If two candidate legs are identified within 3 feet of each other, the center of mass is located and a vector to that center of mass relative to (0,0) (the sensor) is determined at 306 to be the position of the person. LEDs are determined to be centered around the vector that intersects the perimeter of the bed at 308 (i.e., determining LEDs to be turned on) are turned on at 360 (i.e., updating LEDs). The number of LEDs determined to be turned on at 308 increases as the user approaches the bed and those further or different LEDs are turned on at 360. The intensity of the LEDs may also be determined to increase at 308 as the user approaches the bed and the intensity of the LEDs may be increased at 308 (i.e., updating LEDs). A gaussian filter is always or may be applied relative to the center LED to generate a diffused lighting dispersion. As the user moves around the perimeter of the bed, LED positions are updated at 306. Up to two people can be identified at once at 306. If more than two people are detected at 306, the entire perimeter of the bed may be determined to be illuminated at 308 and the LEDs illuminated at 360 according to the determining at 308.

In-bed detection is performed at 312 and out-of-bed detection at 322. If a user is tracked from a distance of one meter or greater from the perimeter of the bed followed by an event of no user found and maintains this state for 5 seconds, it is determined the user has entered an "In-Bed" state at 312. LEDs are turned off once the user is in this state at 360. If the user has been in the state of "In-Bed" for over a predefined number of minutes, and users' legs are then detected within 1 meter of the nominal perimeter of the bed, the underbed illumination system determines the user is out-of-bed at 322. In and out-of-bed occurrences may be tracked at 314 (total occurrences with discrete times) and statistics may be available to the user in a mobile application. The time delta of the first occurrence of "In-Bed" and last occurrence of "Out-of-Bed" is determined to be the coarse sleep time at 324. Offsets to account for standard sleep onset time can be saved in the app to provide more accurate sleep tracking.

The underbed illumination system may also be configured to recognize gestures at 332, for example, of an arm or leg extended adjacent the side of the bed in proximity to the sensors 114. For a swiping gesture, an arm is identified over the edge and it is found that the arm is moving toward the foot of the bed in a "swiping" motion at 334, and the LEDs for that half of the bed are turned on at 360. For a stationary gesture, an arm is draped over the edge and stationary for more than one second, to direct the underbed illumination system to illuminate a small number of LEDs on at low brightness. If the user continues to keep their arm draped and stationary at 336, additional LEDs centered at that location are turned and the brightness of all LEDs increases at 360. The brightness of LEDs always follows a gaussian distribution around the center of mass of the stationary arm. For an "all off" gesture, an arm is identified over the edge of the bed and the arm is moving towards the head of the bed in a "swiping" motion at 338, and all lights are turned off on that side of the bed at 360. The gesture descriptions provided are exemplary and are not intended to be limiting. Other gesture controls may be defined within the underbed illumination system and recognized by the set of sensors 114 for selectively performing control operations.

It may be desirable to configure the underbed illumination system 100 to discriminate between human occupants or users, and other moving objects, such as pets or cleaning robots, as a pet mitigation. If the bed is fully occupied, and 3 or more candidate legs are identified within the span of 4 feet, no LEDs are determined to be turned on at 344 as this is determined to be a pet at 342.

Figure 4:
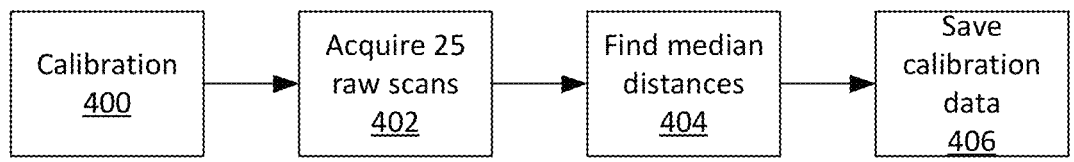
FIG. 4 is a method of calibration of the underbed illumination system as illustrated in FIG. 1.

To improve underbed illumination system performance, a calibration operation 400, illustrated in FIG. 4, may be performed during a setup process or when the user changes the arrangement of the room or environment. The event shall be triggered while the room is in nominal state and void of any occupants. This establishes nominal data from which differences are later computed. In a first step of calibration at 402, multiple scans by the set of sensors 114, for example about 25 raw scans (i.e., scans which have had no correction applied) are acquired from the set of sensors 114. For each discrete integral angle from 0° to 359°, the median distance of open space between a defined origin point for the bed or for the sensor is determined at 404 and saved at 406. The median value among the calibration scans denotes the environment boundary at that polar coordinate angle. An array of size 360 stores the median distances to the environment for each of the discrete angular measurements. When the set of sensors 114 is awake, a distance from origin at a given angle may differ from the calibration distance for that given angle, and may be determined as an active datapoint for controlling the underbed illumination system and determining a user presence or gesture input.

Figure 5:
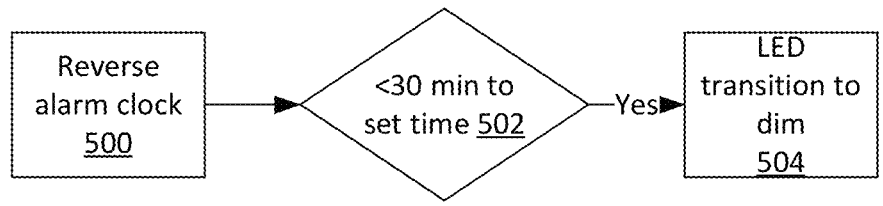
FIG. 5 is a method of operating a reverse alarm clock operation of the underbed illumination system as illustrated in FIG. 1.
Figure 6:
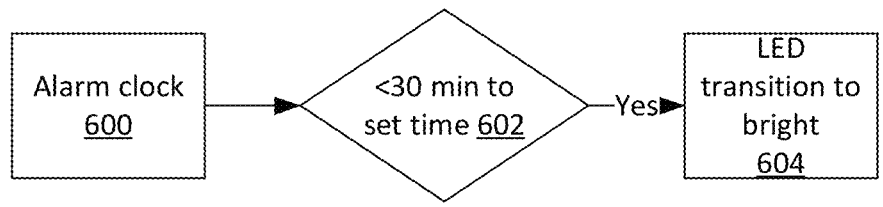
FIG. 6 is a method of operating an alarm clock operation of the underbed illumination system as illustrated in FIG. 1.
Figure 7:
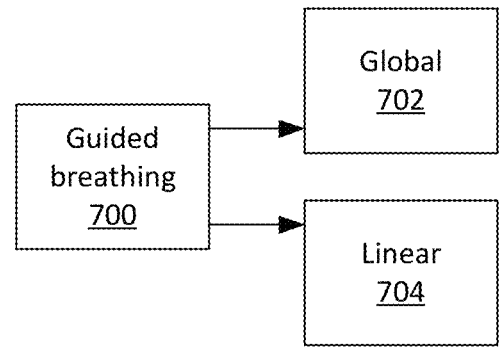
FIG. 7 is a method of operating a guided breathing operation of the underbed illumination system as illustrated in FIG. 1.
Figure 8:
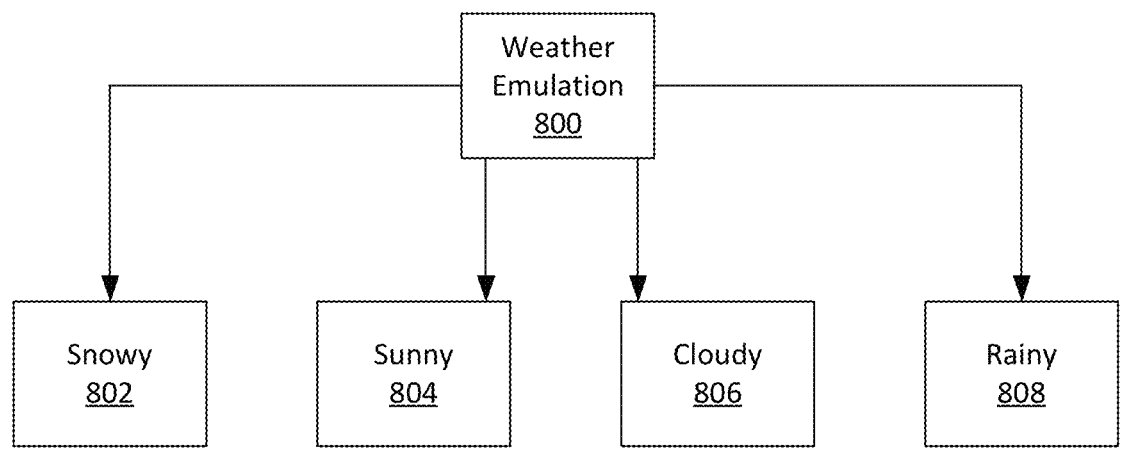
FIG. 8 is a method of operating a weather emulation operation of the underbed illumination system as illustrated in FIG. 1.

Additional functionality of the underbed illumination system is described in FIGS. 5-7. A "reverse alarm clock" operation 500 can be set in the app so that at 30 minutes (or another time preprogrammed or determined by the user) prior to the set time at 502, the LEDs transition from bright to dim at 504, for example, to indicate to the user that bedtime is approaching. The lights may slowly pulse at low intensity when the reverse alarm clock time has been reached, or the lights may extinguish immediately or after a steep ramp down in intensity. An alarm clock operation 600 can be set in the app so that at a preprogrammed or user defined number of minutes (e.g., 30 minutes) prior to the set time at 602, LEDs transition from dim or off to high intensity brightness at 604 to gently assist in waking the user. The lights may slowly pulse at a user defined intensity once the time has passed the alarm time, may persist at high intensity, or may rapidly torn off and on to highest intensity in a stroboscopic effect. Advantageously, the underbed illumination system may be configured to enable the reverse alarm clock or alarm clock operation only while the user is present in bed. If the underbed illumination system determines that the bed is unoccupied, the reverse alarm clock or alarm clock operations may be deactivated without user input, for example, if the user is travelling.

Guided breathing exercises may be operated at 700 via an app. Two example lighting and massage schemes are provided that may be used to guide the users breathing: In a first example 702 (e.g., a global guided breathing operation), head and foot massage motors ramp up and down in frequency while the entire underbed lighting uniformly increases and decreases in intensity. An increasing frequency and intensity signal the user to breathe in. A decreasing frequency and intensity signal the user to breathe out. In a second example 704 (e.g., a linear guided breathing operation), head massage transitions to foot massage while the addressable LEDs illuminate from head to foot of the bed. To signal the user to breathe out, the intensity of the massage vibration and light intensity decreases from high intensity at the head and increases from low intensity at the foot. To signal the user to breathe in, the intensity of the massage vibration and light intensity increases from low intensity at the head and decreases from high intensity at the foot. These transitions in part are an up-and-down wave sensation in the user to breathe in during the upward movement phase and breathe out during the downward movement phase. The underbed illumination system may provide user selectable intensity levels at both the high and low ends and also the transition speeds. To aid in inducing sleep, the underbed illumination system may allow for lengthening time intervals in the breathing exercises.

In an additional example of underbed illumination system operation 800 (e.g., a weather emulation operation), the user can enable morning weather emulation via the app during, for example, an alarm clock operation. Current weather information may be received by the main controller via Bluetooth or WiFi from a remove device. Different weather conditions are then emulated with the underbed LEDs according to predefined associated lighting patterns when the user gets out of bed after the alarm clock has triggered. In one example, to emulate snow at 802, the underbed LEDs may be employed in a cycle of intensity to present twinkling appearance using a white color. In another example, to emulate a sunny day at 804 with little or no cloud cover, the LEDs may be employed in a persistent or high-intensity pulsing illumination in a yellow color. To emulate a cloudy day at 806, blue color may be illuminated in a wave transition pattern up and down the sides of the bed. To emulate rainy weather at 808, a whiter blue color or a dimmer blue intensity may be illuminated along the perimeter of the bed. These example weather emulations are not intended to be limiting and other examples are contemplated within the scope of this disclosure.

Figure 9:
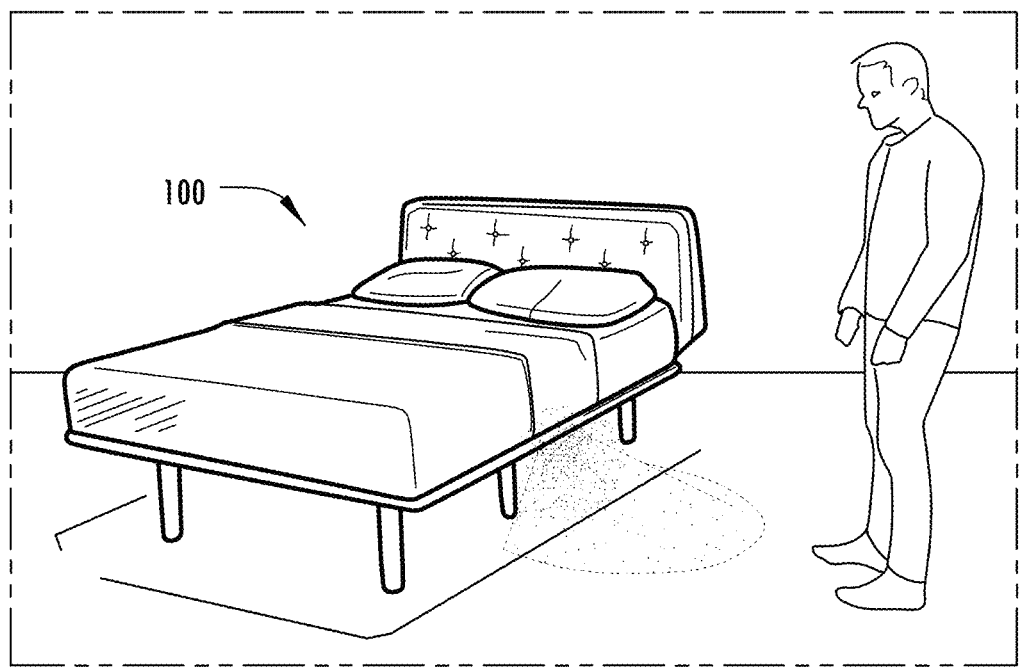
FIG. 9 is a schematic representation of the underbed illumination system as illustrated in FIG. 1 in a first illumination condition
Figure 10:
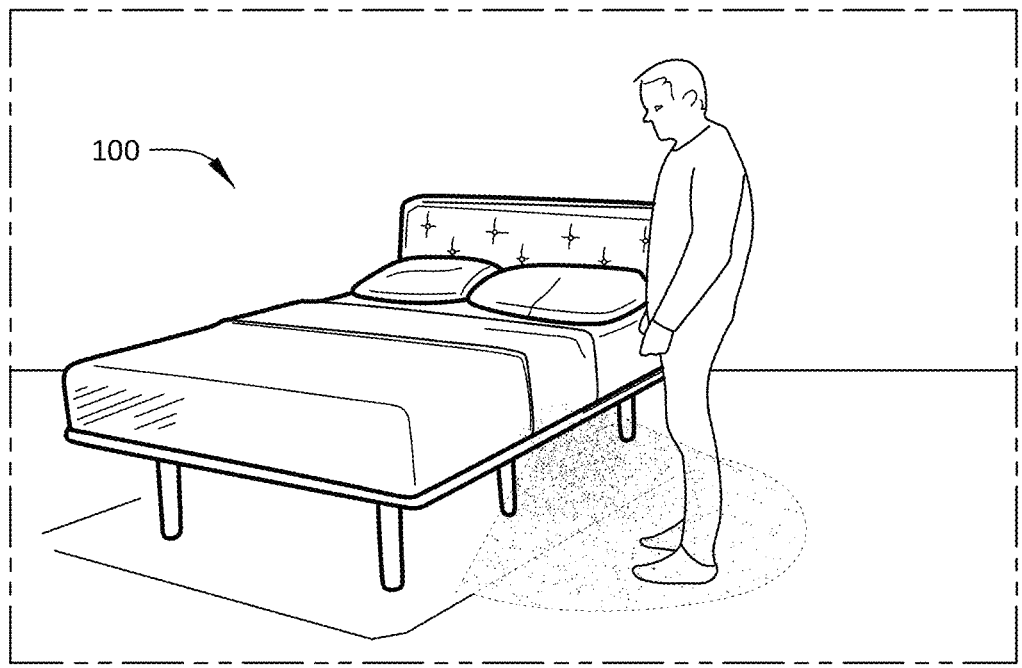
FIG. 10 is a schematic representation of the underbed illumination system as illustrated in FIG. 1 in a second illumination condition.
Figure 11:
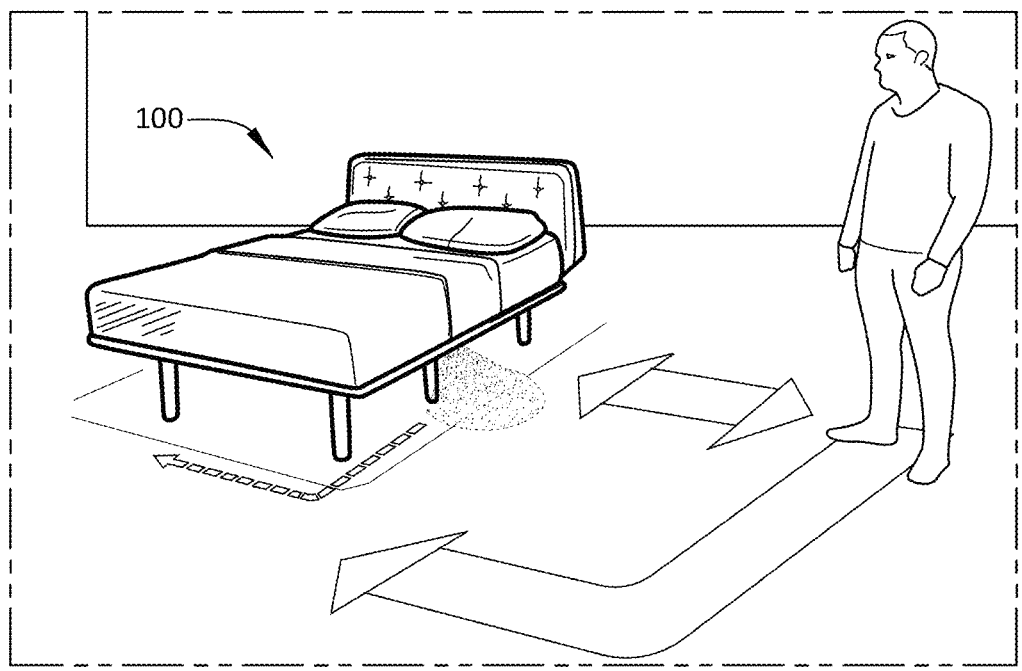
FIG. 11 is a schematic representation of the underbed illumination system as illustrated in FIG. 1 in a transitional illumination operation.

Referring now to FIGS. 9-11, example illumination states are illustrated, which may be performed according to the programming described with respect to FIGS. 2 and 3 (e.g., the updating of the LEDs 216 according to determining a pose 214 and/or the bipedal tracking 302, for example, by calculating the vector to the center of mass 306 and determining LEDs 308 and updating the LEDs 360 according thereto). In FIG. 9, a user is detected by the underbed illumination system 100 at a first far distance from the bed based on the signal or signals generated by the set of sensors 114. The underbed illumination system illuminates at a first low intensity in a portion of the bed closest to the detected user position. In FIG. 10, the user is detected by the underbed illumination system at a second near distance from the bed based on the signal or signals generated by the set of sensors 114. The underbed illumination system illuminates at a second high intensity covering a greater portion of the bed perimeter proximate the user location. FIG. 11 illustrates the bed's reaction as the user moves in a direction parallel to the perimeter of the bed. The illumination intensity remains constant for a constant distance between the bed and the user and the position of the powered LEDs along the perimeter is translated along the side of the bed corresponding to the changing position of the user relative to the bed.

Figure 12:
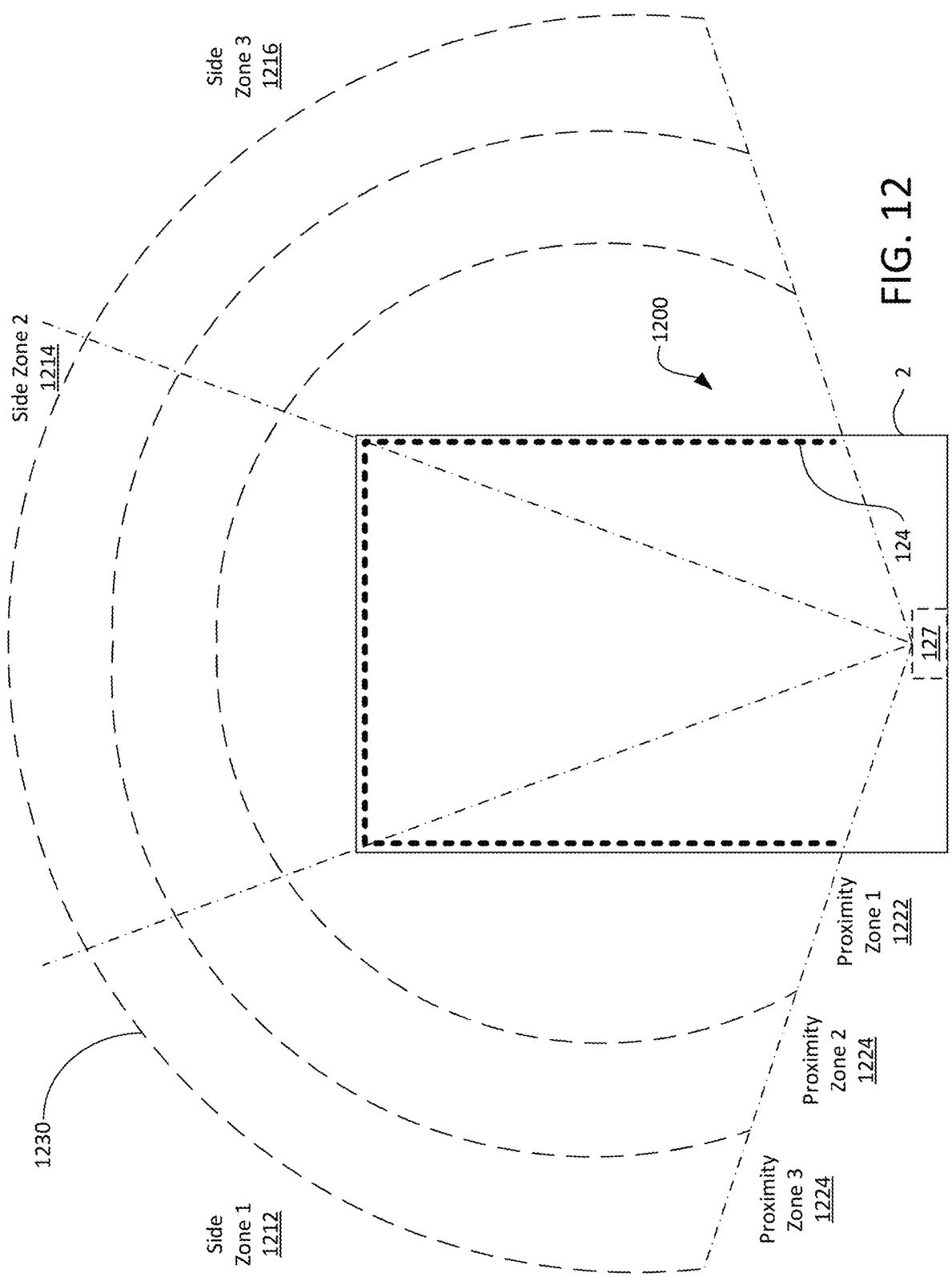
FIG. 12 is a schematic view of an underbed illumination system and a detection zone.

Referring to FIG. 12, an underbed illumination system 1200 is an embodiment of the underbed illumination system 100, which includes the sensor 127 and the LED strips 124 (as shown) and may further generally include the external power supply 102, the main controller 104, the microcontroller 106, the memory 108, and the LED driver 122 (not shown). The underbed illumination system 1200 may further include those other components described for the underbed illumination system 100 (e.g., the communications devices, such as for Bluetooth 110 or WiFi 112, the other sensors of the sensor suite 104, the actuators of the bedframe adjustment component 130, and/or the audio components). The sensor 127 may, for example, be a RADAR sensor. The sensor 127 may be positioned below the bed 2 (e.g., coupled to an underside of a bed frame supporting a mattress thereof), above the floor on which the bed 2 is positioned, and toward a head end of the bed. The sensor 127 may have a lateral field of view that spreads substantially evenly to left and right sides of the bed 2 over an angular range, for example, of between 100 and 170 degrees (e.g., between 110 and 140 degrees, such as approximately 120 degrees). The vertical field of view of the Sensor 127 may be limited (e.g., constrained) by the bed 2 and the floor. The underbed illumination system 1200 may, instead, include additional sensors 127 at other positions (e.g., three of the sensors 127 that generally correspond to sensing persons to the left, foot, and right sides of the bed 2 and which may be arranged adjacent such sides of the bed 2 or at a central location under the bed 2.

Figure 13:
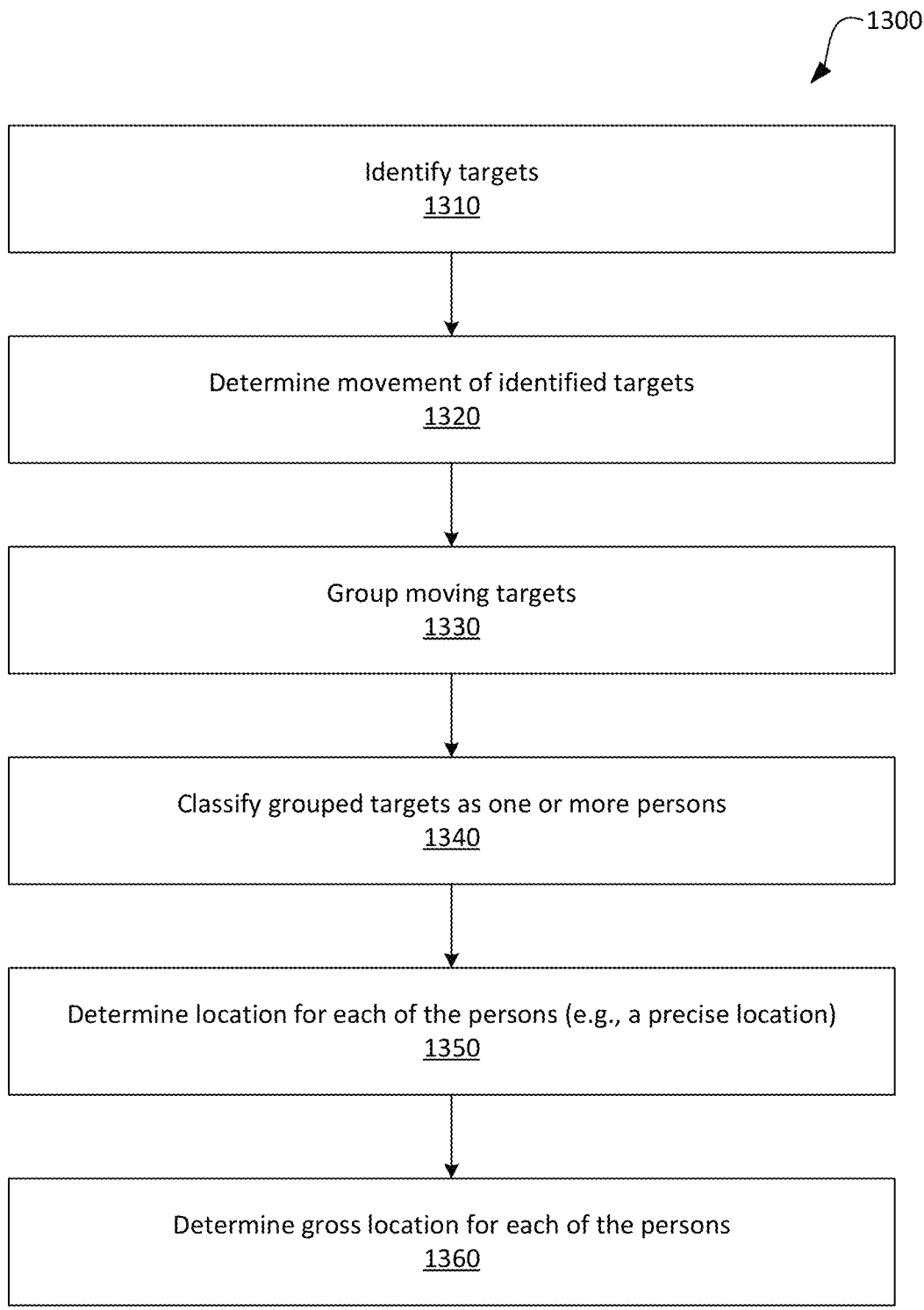
FIG. 13 is a flow diagram of a method for determining a location of a person with the underbed illumination system of FIG. 12.
Figure 14:
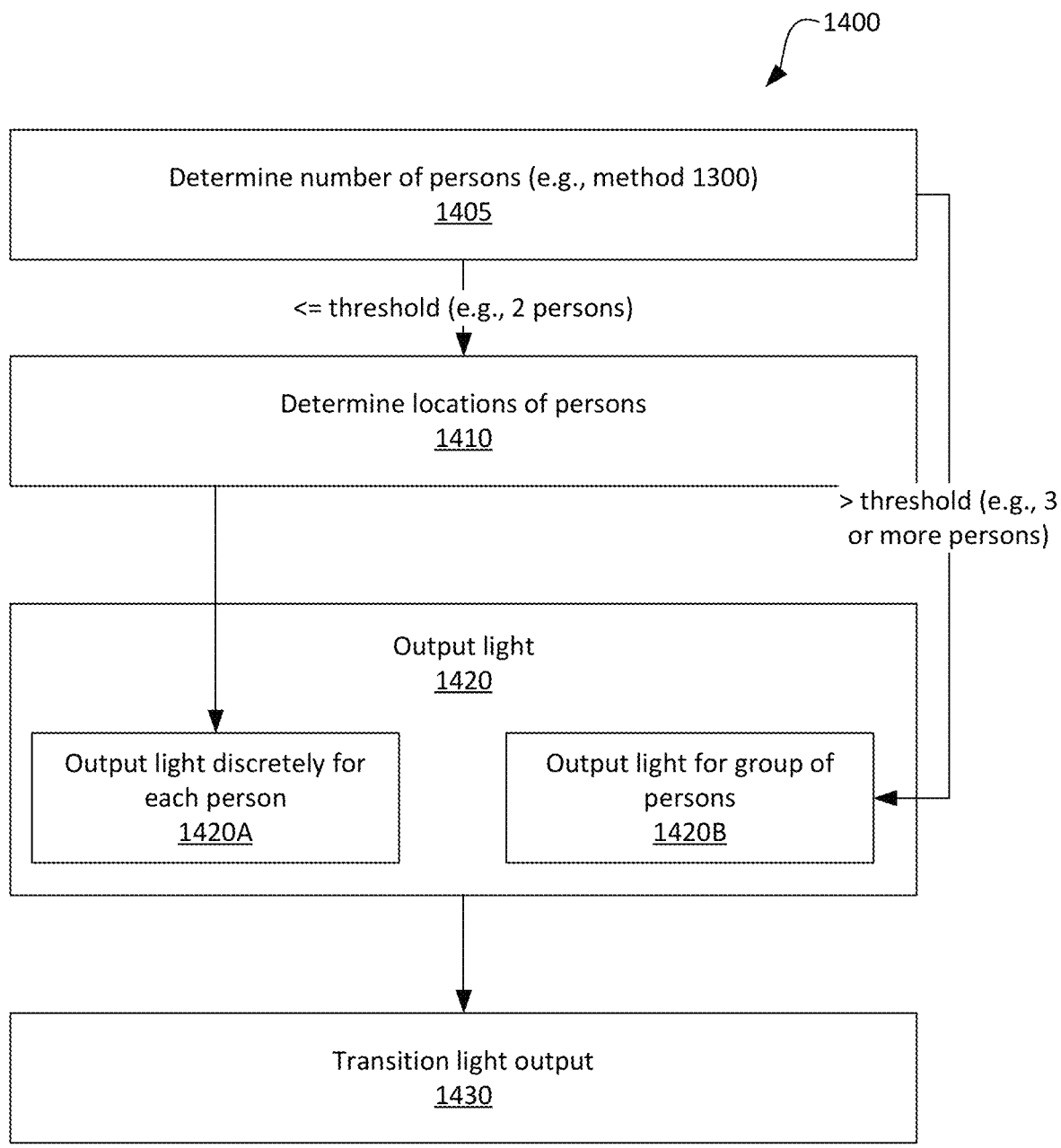
FIG. 14 is a flow diagram of outputting light according to the location of the person.

Referring additionally to FIGS. 13 and 14, the underbed illumination system 1200 is configured to identify one or more users, determine a location of each of the users, and illuminate the LEDs of the LED strips 124 according thereto, for example, by location and brightness of the LEDs. For example, the underbed illumination system 1200 may determine to illuminate one or more of the LEDs positioned generally between the sensor 127 and the user, increase the brightness of the LEDs the closer the person is to the sensor 127 and thereby the bed 2, and may further illuminate more of the LEDs the closer to the user is to the sensor 127 and thereby the bed 2.

Referring to FIG. 13, the underbed illumination system 1200 is configured to identify persons, for example, distinguishing persons (i.e., human beings) from objects and animals. The underbed illumination system 1200 may, for example, be configured to identify a person by firstly identifying various targets and movement thereof. Those targets may be detected with the sensor 127 and suitable software executed by the controller 104 (e.g., the microcontroller 106). Those targets detected and determined to not be moving (e.g., furniture) are determined to not be persons, for example, by detecting no movement thereof for a threshold time (e.g., 3 seconds, more or less). Non-moving targets may be repeatedly detected when operating the underbed illumination system 1200 or stored by the underbed illumination system 1200 and periodically detected. Those targets detected and determined to be moving may be determined to be persons, for example, by detecting two targets in close proximity to each other (e.g., within a threshold distance, such as within two feet or less) that correspond to legs of a person (e.g., as described above for bipedal tracking), which are together identified as being a person. If more moving objects are detected in close proximity to each other (e.g., three or more), the objects may be determined to be a non-person (e.g., an animal). The underbed illumination system 1200 may identify one, two, or more persons.

Still referring to FIG. 13, the underbed illumination system 1200 is further configured to determine the locations of any identified persons. As referenced above of the underbed illumination system 100, the underbed illumination system 1200 may determine the location of the identified persons by identifying center of mass of the identified persons. For example, the underbed illumination system 1200 may determine vectors from the sensor 127 to each of the legs of the identified person (i.e., determining distance and direction) and average those vectors to determine the location of the person. Alternatively, the underbed illumination system may determine the locations according in any other manner, for example, by determining the location of the identified person as being the nearest object (i.e., leg) thereof to the sensor 127, for example, by determining the vector from the sensor 127 to the nearest leg. In this manner, the underbed illumination system 1200 determines precise locations of the persons.

The location of each of the persons may further be determined according to a gross location, for example, according to side and proximity zones (e.g., forming a grid around the bed 2). The location of the persons may be positioned relative to the Sensor 127 at a different side position (e.g., left, foot, or right sides of the bed 2) and proximity (i.e., stepped distances from the bed 2 and/or the sensor 127). The sides may generally be defined as a first side zone 1212 (e.g., left side zone), a second side zone 1214 (e.g., a foot side zone), and a third size zone 1216 (e.g., a right side zone). The second side zone 1214 may generally be that angular region extending from the sensor 127 to regions proximate left and right corners at the foot side of the bed 2. The first side zone 1212 is that angular region to the left of the second side zone 1214 and within the field of view of the sensor 127, and the third size zone 1216 is that angular region to the right of the second side zone 1214 and within the field of view of the Sensor 127. The underbed illumination system 1200 may be configured with more than three side zones, for example, having two left, two right, and two foot side zones. The underbed illumination system 1200 may be programmed with the side zones 1212, 1214, 1216 (e.g., being predefined, determined during calibration, or being programmed by a user, for example, by inputting a standard bed size) and may determine whether one or more of the users are within one or more of the side zones 1212, 1214, 1216 (e.g., by the calculating of the center of mass 306 from the Sensor 127 to the user).

A person may also be positioned at different distances from the sensor 127 and, thereby, relative to the bed 2. The distances from the user to the sensor 127 or the bed 2 may be defined as a first proximity zone 1222 nearest the bed 2 (e.g., a near proximity zone), a second proximity zone 1224 between the first proximity zone 1222 and a third proximity zone 1226 (e.g., a middle proximity zone), and the third proximity zone 1226 furthest from the bed (e.g., a far proximity zone). The underbed illumination system 1200 may be programmed with the proximity zones 1222, 1224, 1226 (e.g., being predefined, determined during calibration, or being programmed by a user, for example, by inputting a standard bed size). While depicted as being generally semi-circular regions emanating from the sensor 127, the proximity zones 1222, 1224, 1226 may instead be defined as a distance from the perimeter of the bed 2. The near proximity zone 1222 may originate at the perimeter of the bed 2 and extend radially outward a single distance from the bed 2 (e.g., between 50 and 100 centimeters), a single distance from the sensor 127, or a variable distances from the bed 2 or the sensor 127 extending around the perimeter of the bed 2. The middle proximity zone 1224 originates from the outer periphery of the near proximity zone 1222 and extends radially outward a single or variable distance therefrom, such as between 50 and 100 centimeters. The far proximity zone 1226 originates from the outer periphery of the middle proximity zone 1224 and extends radially outward a single or variable distance therefrom, such as between 50 and 100 centimeters. The outer periphery of the far proximity zone 1226 may, for example, be between 150 and 300 centimeters (e.g., between 175 and 225 centimeters) from the perimeter of the bed 2. The underbed illumination system 1200 may define fewer or more proximity zones, such as two, four, or five.

The side zones 1212, 1214, 1216 and the proximity zones 1222, 1224, 1226 may cooperatively define a detection area 1230 for the underbed illumination system 1200 in which the user must be for the LEDs to output light if according to the location of the user. By determining the gross location of each person, the underbed illumination system 1200 may illuminate the LEDs in a steadier manner than if continuously changed according to the precise location of the person.

For example, still referring to FIG. 13, the underbed illumination system 1200 may perform a method 1300 of determining the location of one or more persons, which is performed with the sensor 127 and the controller 104 (e.g., the microcontroller 106). The method 1300 generally includes identifying targets 1310, determining movement 1320 of the identified targets, grouping the moving targets 1330, classifying the grouped moving targets as persons 1340, and determining a location 1350 of each of the persons. The method 1300 may further include determining a gross location 1360 of each of the persons.

The identifying of the targets 1310 is performed with the sensor 127 (e.g., sending and receiving signals) and the controller 104. The identifying of the targets 1310 may include determining a distance and a direction to the target.

The determining movement 1320 includes continuously the distance and the direction of the identified target and identifying changes in the distance and direction over time (e.g., over a specified threshold time).

The grouping of the moving targets 1330 is performed by determining, for example, the proximity of the targets to each other, for example, being within a threshold distance of each other over time (e.g., within two feet or less of each other).

The classifying as persons 1340 the grouped targets is according to the number of the targets in each group. If the group includes two targets, the group is classified as a person. Alternatively, if the group includes fewer than two targets (i.e., two or one target), the group is classified as a person. If the group includes other numbers of targets, the group is classified as non-person, for example, in binary manner or another type of target.

The determining the location 1350 of the person is performed continuously and may be determined in various manners, for example, as the direction and distance of the nearest identified target of the person (i.e., one leg) or an average of the direction and distances of the targets of the person (i.e., the two legs). The location determined in 1350 may be considered a precise location. The determining a gross location 1360 may be performed continuously according to the precise location of the person, for example, by determining a side zone (e.g., as one of two, three, or more angular regions relative to the sensor 127 and the bed 2) and a proximity zone (e.g., as one of two, three, or more distances regions relative to the sensor 127 and the bed 2).

Referring to FIG. 14, as referenced above, the underbed illumination system 1200 is configured to illuminate the LEDs of the LED strips 124 as persons move relative to the bed 2. For example, the underbed illumination system 1200 may be configured to turn on and off the LEDs as the persons enter into or leave the detection area, vary the location of the light output as the persons move about the bed 2, and increase the intensity of the light output as one or more persons move toward the bed 2.

When no persons are inside the detection area, such as when a person is too far from the bed 2 or is on the bed 2, the underbed illumination system 1200 does not output light according to the location of the such persons. It should be noted that the underbed illumination system 1200 may be configured to still output the light according to other criterion. When a person enters into the detection area 1230, the underbed illumination system 1200 begins to output the light, and when a person leaves the detection area 1230, the underbed illumination system 1200 stops outputting the light. The detection area 1230 may, as described above, be defined relative to the sensor 127, such as a distance or a combination of distance and direction (see FIG. 12 and FIGS. 15A-15C), or relative to the bed 2 (see FIGS. 16A-16C), such as distances from the left, right, and foot sides thereof. The detection area 1230 may include the side zones 1212, 1214, 1216 and the proximity zones 1222, 1224, 1226. The detection area 1230 may, for example, extend a uniform or varied distance of between approximately 100 and 300 centimeters from the left, right, and foot sides of the bed 2, such as between 175 and 225 centimeters, either curving around corners of the bed 2 or extending parallel with the sides of the bed 2.

The underbed illumination system 1200 may be further configured to output light according to each one identified person or each of multiple persons and output light generally if the identified persons exceed a threshold number, such as two. For example, if more than two persons are detected, the underbed illumination system 1200 may output light around the entire perimeter of the bed 2 at which the LEDs are located, stop outputting light, output light according to only the first person detected, or output light according to the person nearest the best 2.

The underbed illumination system 1200 may also be configured to transition between illumination states. For example, as a person enters the detection area from the perimeter thereof, the LEDs may gradually increase brightness from 0% to an initial brightness (e.g., between 25% and 75% of a maximum brightness) over a predetermined period of time (e.g., 3 seconds). As a person enters the detection area from the bed 2, the LEDs may gradually increase brightness from 0% to the maximum brightness over a predetermined period of time (e.g., 3 seconds). As a person leaves the detection area, the LED's may gradually decrease in brightness to 0% of the maximum brightness over a predetermine period of time corresponding to the initial brightness (e.g., 3 seconds if starting from maximum brightness).

Still referring to FIG. 14, the underbed illumination system 1200 is configured to perform a method 1400 that generally includes determining the locations of persons 1410, outputting light 1420, and transitioning the light output 1430. The method may also include determining the number of persons 1405.

The determining of the number of persons 1405 and the determining the locations of persons 1410 may be performed according to the method 1300, as described previously.

The outputting light 1420 includes outputting the light according to each of the persons 1420A. For example, if the number of persons is two or fewer (i.e., at or below a threshold of two), the light is output in discrete manners for each of the persons. More particularly, the light is output by the LEDs at locations and brightnesses that correspond to the location of each of the users. For example, the underbed illumination system 1200 determines which of those LEDs to output light according to a direction of the person relative to the sensor 127 or the bed 2. The underbed illumination system 1200 further determines the brightness of the light output by those LEDS according to a distance of the person relative to the sensor 127 or the bed.

Figure 15A:
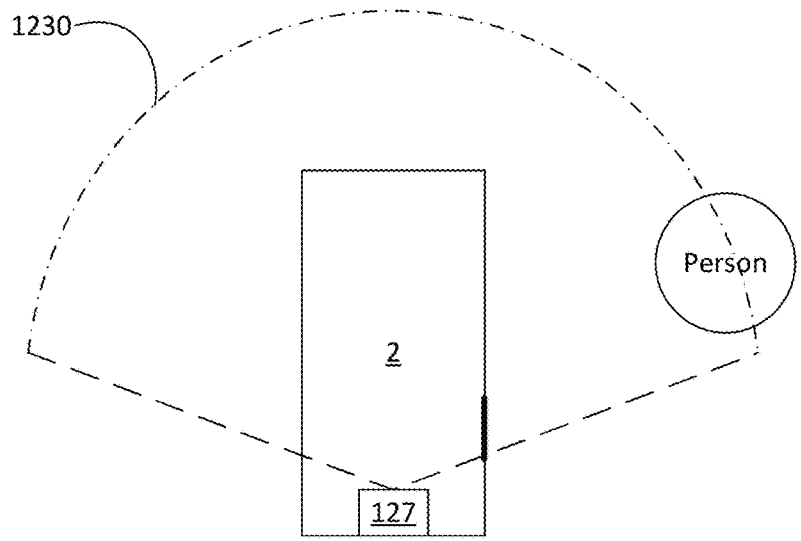
FIGS. 15A-15C are schematic illustrations of light being output according to precise locations of the person far and to the right side of the bed, midrange and to the left side of the bed, and near and to the foot side of the bed.
Figure 15B:
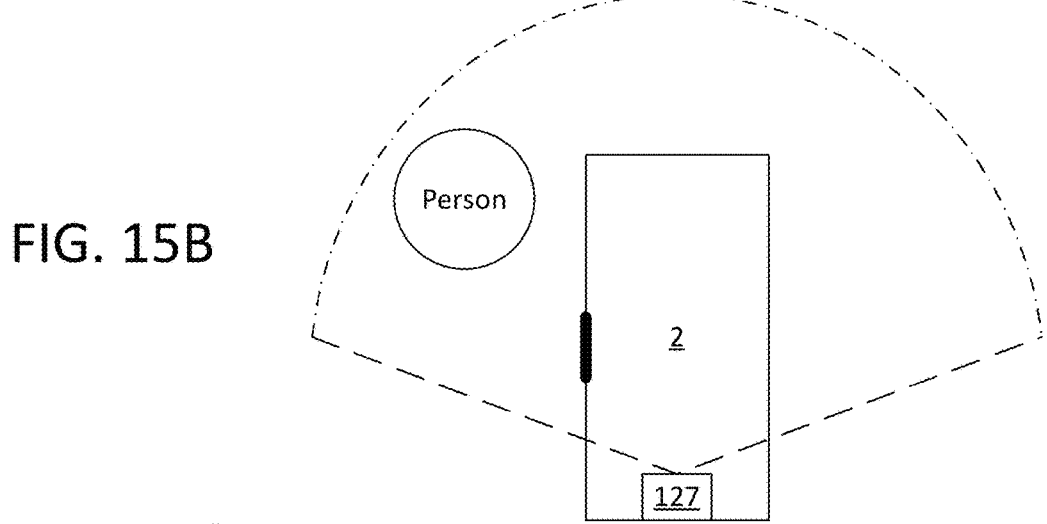
Figure 15C:
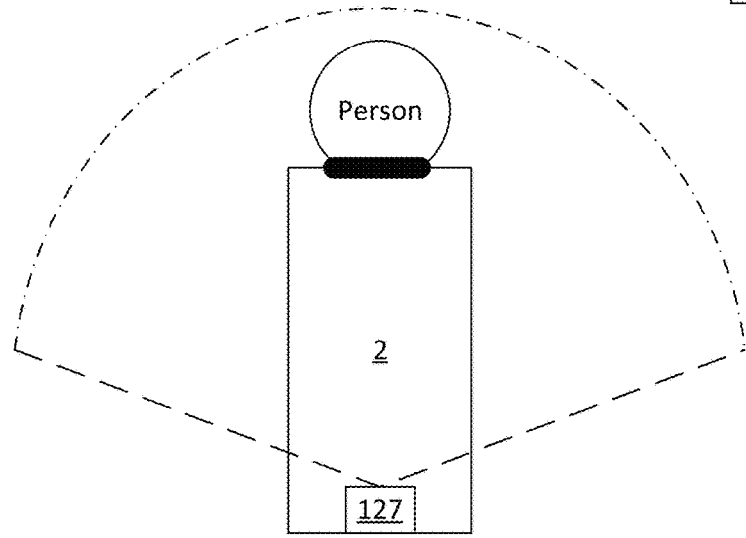

For example, as described above with respect to the vector intersecting the perimeter of the bed, the underbed illumination system 1200 may determine and output light from those LEDs according to the precise location of the user by outputting light from those LEDs that are about (e.g., intersecting and on either side of) a line extending between the person and the sensor 127 or another location (e.g., a central portion or centroid of the bed 2) (see, e.g., FIGS. 15A-C). In another example, the underbed illumination system 1200 may determine and output light according to the gross location of the persons from those LED's in the side zone 1212, 1214, 1216 in which the person is located (e.g., a majority of the LED's within the corresponding side zone and no, or a relatively low portion of LED's in adjacent side zones (see, e.g., FIGS. 16A-16C).

Further, the underbed illumination system 1200 determines and outputs light from the LEDs at brightnesses corresponding to the proximity of the person to the bed 2 of the sensor 127. For example, the brightness may increase gradually from an initial brightness (e.g., between 25% and 75%, such as between 40% and 60% of maximum brightness) at the outer periphery of the detection area 1230 to a maximum brightness (e.g., 100%) at the outer perimeter of the bed 2 (see, e.g., FIGS. 15A-15C). When configured to output light according to the precise location of the person, the gradual increase may, for example, be linear according to distance or another curve. Alternatively, when configured to output the light according to the gross position of the user, the brightness may increase in a stepped manner from the initial brightness in the outer proximity zone 1326 (e.g., as described above) through an intermediate brightness in the middle proximity zone 1324 (e.g., between 60% and 90%, such as between 70% and 80%) to the maximum brightness in the inner proximity zone 1322.

The outputting light 1420 may include outputting the light according to a group of persons 1420B. For example, if the number of persons is more than one or more than a threshold (e.g., two), the light is output according to the group as opposed to all of the persons individually. Outputting light according to the group of people may include outputting light around the entire periphery where the LEDs are located or the side of the bed 2 where the group is located (e.g., with or without varying the brightness according to a distance to the group of persons), according to the nearest person or first person identified of the group (e.g., as described above for 1420A)

Figure 16A:
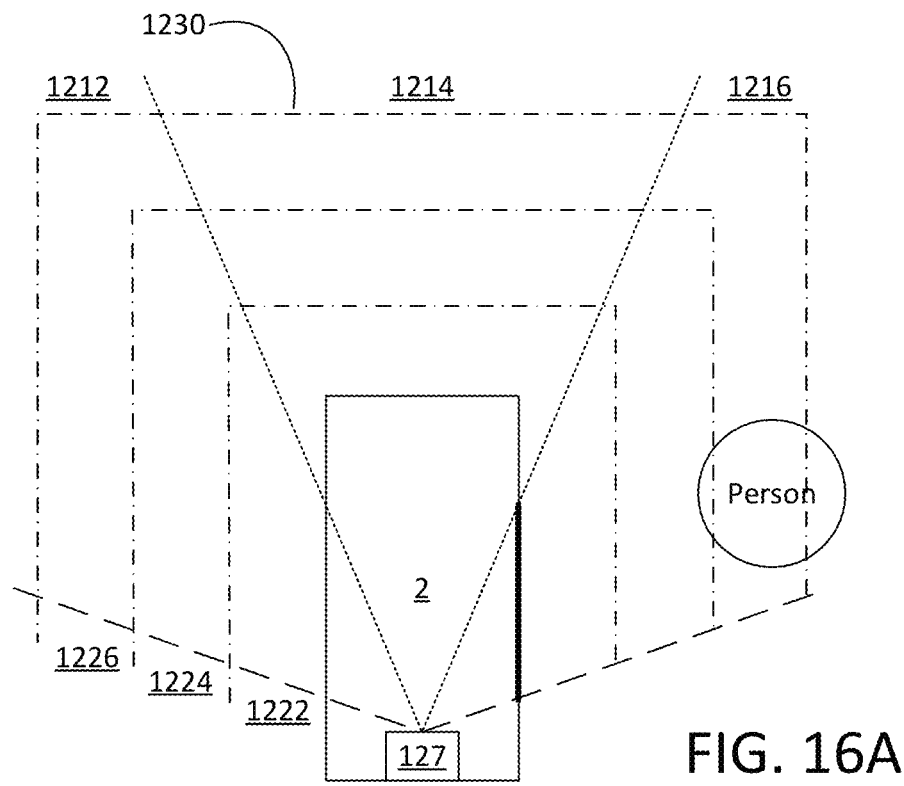
FIGS. 16A-16C are schematic illustrations of light being output according to gross locations of the person far and to the right side of the bed, midrange and to the left side of the bed, and near and to the foot side of the bed.
Figure 16B:
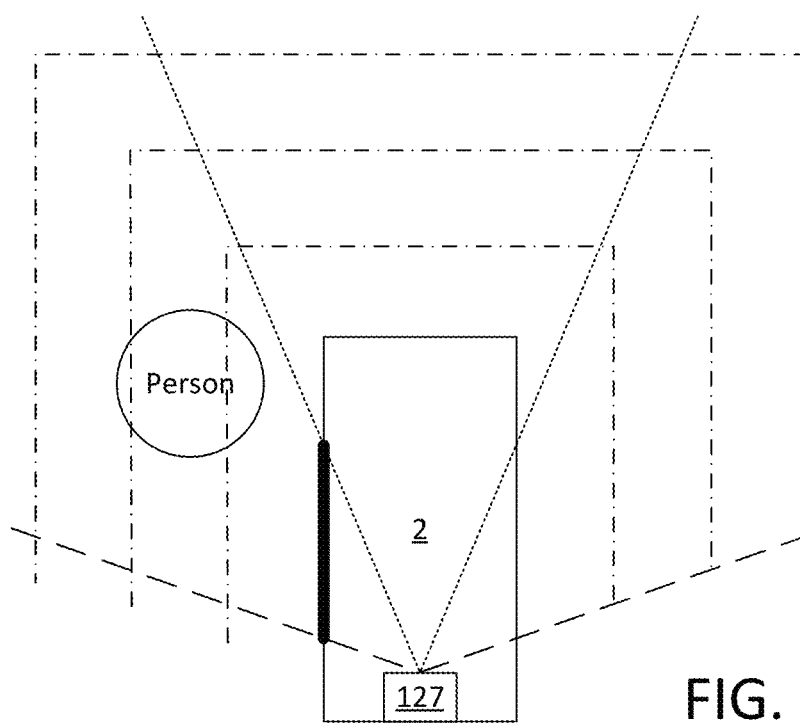
Figure 16C:
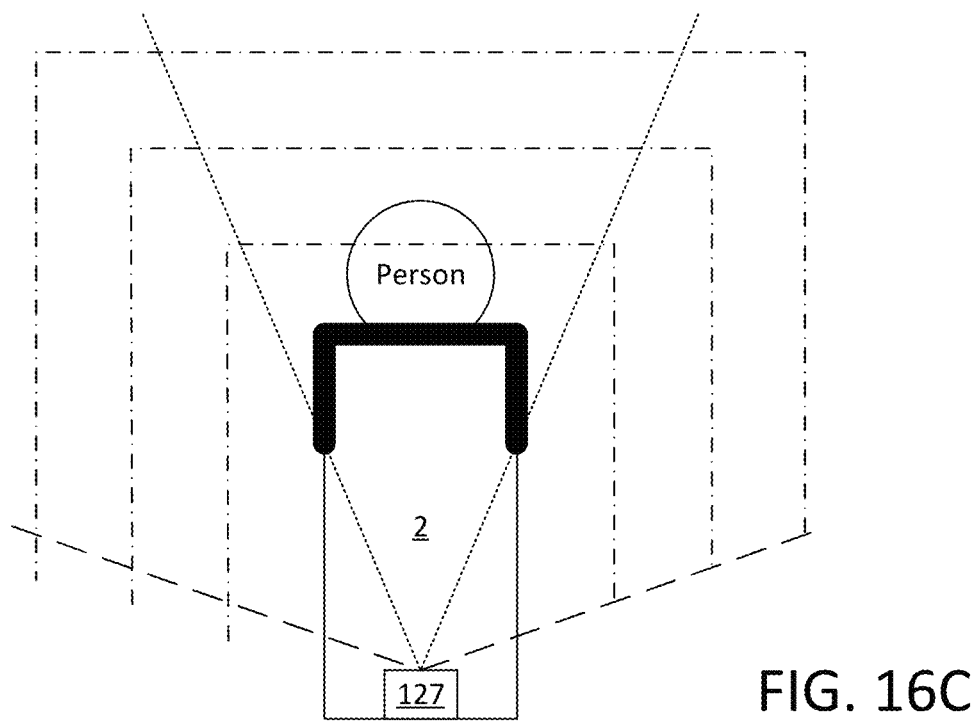

The transitioning of the light output 1430 includes gradually changing the manner and location in which the light is output as the number of persons changes and/or the locations of those persons change. For example, as the number of persons changes from zero to more than zero, the light output may gradually increase in brightness over a predetermined time (or predetermined brightness to time curve) from 0% to the initial brightness as a person enters the detection area from the outer perimeter thereof or to the maximum brightness as a person enters the detection area from the bed 2. As shown and described with respect to FIGS. 15A-15C, the location and brightness of the light output may be changed gradually as the user moves. As shown in FIGS. 16A-16C, the location and output of the light changes in a stepped manner (e.g., according to the gross locations within the side zones 1312, 1314, 1316 and the proximity zones 1322, 1324, 1326) and may be changed gradually between each step (e.g., over a predetermined time, such as 3 seconds, or a predetermined brightness to time curve, such as a linear curve of a predetermined time over 0% to 100% brightness).

Referring to FIGS. 15A-15C and 16A-16C referenced above, schematics are provided that illustrate different light outputs according to the precise and gross locations of persons. In each case, the field of view of the sensor 127 is depicted in long dashed lines. The detection area 1230 is depicted in dash-dot lines. The light output is depicted in thick solid line with the thicker line representing brighter output. In each instance, when the person is outside the detection area 1230 or on the bed 2, the underbed illumination system 2 does not output light according to the location of the person. FIGS. 15A-15C represent light being output according to precise locations of the person relative to the sensor 127 and the bed 2 in which the person is positioned a far distance from and to the right side of the bed 2 in FIG. 15A, a middle distance from and to the left side of the bed 2 in FIG. 15B, and a close distance from and to the foot side of the bed 2 in FIG. 15C. In FIGS. 15A-15C the light is output from LEDs located generally between the person and the sensor 127 (e.g., about a line between the sensor 127 and the person). FIGS. 16A-16C represent light being output according to gross locations of the person relative to the sensor 127, which are the same as those generally described for FIGS. 15A-15C. In FIGS. 16A-16C the light is output from LEDs located along the side of the bed 2 corresponding to the person.

Figure 17:
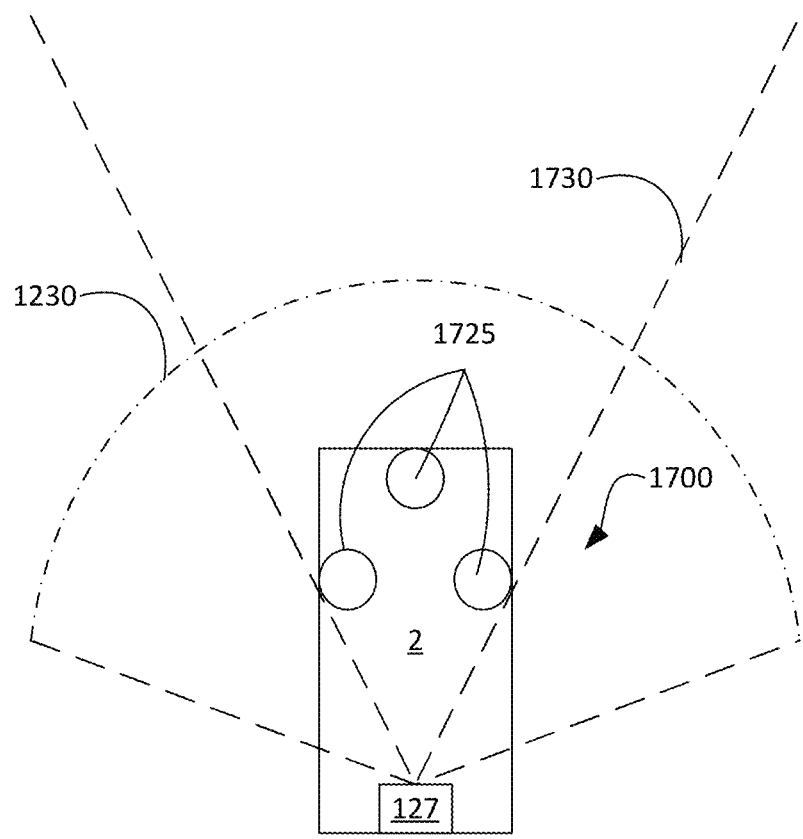
FIG. 17 is a schematic view of another embodiment of an underbed illumination system.

Referring to FIG. 17, an underbed illumination system 1700 is a variation of the underbed illumination systems 100, 1200, which is configured to output images to persons. The underbed illumination system 1700 generally includes the sensor 127 (e.g., a RADAR sensor, or a PIR sensor) and an image projector 1725. The underbed illumination system may further generally include the external power supply 102, the main controller 104, the microcontroller 106, and the memory 108, and may further include those other components of the underbed illumination system 100, such as the LED driver 122 (not shown), the LED strips 124, and/or those other components described for the underbed illumination system 100. For example, in addition to projecting images, the underbed illumination system 1700 may be configured to operate as described previously for the underbed illumination systems 100, 1200, for example, to output light with LEDs according to the locations of persons.

The underbed illumination system 1700 is configured to detect persons and output images thereto, for example, by projecting the images downward onto the ground to be viewed by the persons. The underbed illumination system 1700 may be configured to be used in a sales environment (e.g., a bed showroom), a bedroom environment, or both.

The underbed illumination system 1700 detects persons with the sensor 127, for example, as described above, with the sensor 127 being a RADAR sensor or simply detection motion with the PIR sensor. The image projector 1725 is mounted to an underside of the bed 2 or otherwise to a perimeter of the bed 2. The image projector 1725 may be configured to output one or more fixed images (e.g., one or more slides, which may be in a carousel or switched manually by users), which may include sales information about the bed 2. The image projector 1725 may be a display projector, such as a DLP (referenced previously), which may be configured to output one or more programmed images or motion graphics.

For the sales environment, in which multiple beds are positioned in close proximity, the image projector 1725 may be positioned at the foot side of the bed 2, which may generally be more accessible for viewing by persons (e.g., customers). For the bedroom environment, the image projector 1725 may output graphics that provide variable information to persons (e.g., weather information that changes by day, sleep information about the person). For the bedroom environment, the underbed illumination system 1700 may include image projectors 1725 at sides of the bed, as shown.

The underbed illumination system 1700 may be a singular underbed illumination system further configured to operate differently in both the sales and bedroom environment. For example, the underbed illumination system 1700 may be configured with different detection areas 1730, 1230 in the sales and bedroom environments, for example, being switchable between a first mode (e.g., a sales mode) in which the detection area 1730 extends further from the bed 2 than in a second mode (e.g., a bedroom mode) in which the detection area 1230 extends as described previously. The detection area 1730 may have the same angular width (e.g., field of view) as the detection area 1230 or be narrower (as shown in FIG. 17).

For purposes of this disclosure, the term "coupled," "mounted," or the like (in all forms, e.g., couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated. Similarly, the terms "coupled," "supported," "joined," "mounted," in all their forms, should be understood similarly to include directly or indirectly, permanently or impermanently, rigidly or resiliently, unless stated otherwise.

For purposes of this disclosure, the articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims.

Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An underbed illumination system comprising:
    a sensor mountable to an underside of a bed and having a field of view that extends to left, foot, and right sides of the bed;
    one or more lights configured to mount to the bed and output light downward from the bed; and
    a controller configured detect a person with the sensor and operate the lights to output the light according to the detection of the person;
    wherein the controller is configured to determine a location of the person according to the sensor and operates the lights to output light according to the location of the person;
    wherein the location includes a direction and a distance from the sensor to the person;
    wherein the controller determines which of the lights to output the light according to the direction and determines brightness of the light output by those lights according to the distance; and
    wherein the controller increases the brightness of the light output by the lights as the distance decreases.

2. The underbed illumination system according to claim 1, wherein the sensor is a RADAR sensor.

3. The underbed illumination system according to any of claim 1, wherein the one or more lights include light emitting diodes (LEDs).

4. The underbed illumination system according to claim 1, wherein the controller determines which of the lights to output the light to be those LEDs that are about a vector extending from the sensor to the person.

5. The underbed illumination system according to any of claim 1, wherein the controller gradually increases the brightness of the light output by the lights as the person moves closer to the bed.

6. The underbed illumination system according to claim 1, wherein the controller determines which of the lights to output the light according to one of three or more side zones in which the person is located, each of the side zones being an angular region within a field of view of the sensor.

7. The underbed illumination system according to claim 6, wherein the controller increases the brightness of the light output by the lights in a stepped manner as the person moves closer to the bed from an outer proximity zone to an inner proximity zone, the outer proximity zone being positioned away from the bed and the inner proximity zone being adjacent the bed.

8. The underbed illumination system according to claim 1, wherein the controller is configured to determine when the person enters or leaves a detection zone and, respectively, gradually increases or decreases the brightness of the light output by the lights.

9. The underbed illumination system according to claim 1, wherein if the controller determines the locations of two persons, the controller operates the lights according to the locations of the two persons.

10. The underbed illumination system according to claim 1, wherein the controller determines which of the lights are illuminated according to the direction.

11. The underbed illumination system according to claim 10, wherein the controller determines the lights that output the light are in the direction from the sensor to the person.

12. The underbed illumination system according to claim 11, wherein the controller determines which of the lights are illuminated in a stepped manner according to multiple zones that are spaced apart around the sensor.

13. The underbed illumination system according to claim 1, wherein the controller determines the brightness according to the distance in a stepped manner.

14. The underbed illumination system according to claim 13, wherein the controller determines the brightness in the stepped manner according to multiple zones that are spaced apart from the sensor.

15. An underbed illumination system comprising:
    a sensor mountable to an underside of a bed and having a field of view that extends to left, foot, and right sides of the bed;
    one or more lights configured to mount to the bed and output light downward from the bed; and
    a controller configured to detect a person with the sensor and operate the lights to output the light according to the detection of the person;
    wherein the one or more lights include light emitting diodes (LEDs);
    wherein if the controller determines locations of the person and another person, the controller operates the lights according to the locations of the person and the other person; and
    wherein if the controller determines the location of a third person, the controller operates the lights according to only one of the person, the other person, or the third person.

16. A method for underbed illumination comprising:
    determining, with a sensor coupled to a bed, a location of a person; and
    outputting, with lights coupled to the bed, light according to the location of the person;
    wherein the determining the location includes determining a direction and a distance of the person relative to one of the sensor or another position central to the bed; and
    wherein the outputting the light includes determining a subset of the lights that output the light according to the direction and determining an intensity of the light output by the subset of lights according to the distance.

17. The method according to claim 16, wherein the subset of the lights are positioned between the one of the sensor of the other position and the person, and the intensity of the light increases as the distance lessens.

18. The method according to claim 16, wherein the subset of the lights and the intensity of the light change gradually as the location determined with the sensor changes.

19. The method according to claim 16, wherein the subset of the lights and the intensity of the light change in a stepped manner as the location determined with the sensor changes.

* * * * *